(12) United States Patent
Carson et al.

(10) Patent No.: US 11,071,319 B2
(45) Date of Patent: Jul. 27, 2021

(54) WHEAT BASED BINDING AGENT AND METHODS OF MAKING AND USING SAME

(71) Applicant: Manildra Milling Corporation, Leawood, KS (US)

(72) Inventors: Brook Carson, Prairie Village, KS (US); Neal Bassi, Overland Park, KS (US)

(73) Assignee: MANILDRA MILLING CORPORATION, Leawood, KS (US)

( * ) Notice: Subject to any disclaimer, the term of this patent is extended or adjusted under 35 U.S.C. 154(b) by 45 days.

(21) Appl. No.: 16/188,602

(22) Filed: Nov. 13, 2018

(65) Prior Publication Data

US 2019/0142049 A1    May 16, 2019

Related U.S. Application Data

(60) Provisional application No. 62/585,327, filed on Nov. 13, 2017.

(51) Int. Cl.

| | |
|---|---|
| *A23L 33/185* | (2016.01) |
| *A23L 27/40* | (2016.01) |
| *A23L 29/212* | (2016.01) |
| *A23G 3/44* | (2006.01) |
| *A23G 1/44* | (2006.01) |
| *A23L 7/126* | (2016.01) |
| *A23P 10/20* | (2016.01) |
| *A23J 3/18* | (2006.01) |

(52) U.S. Cl.
CPC ............. *A23L 33/185* (2016.08); *A23G 1/44* (2013.01); *A23G 3/44* (2013.01); *A23J 3/18* (2013.01); *A23L 7/126* (2016.08); *A23L 27/40* (2016.08); *A23L 29/212* (2016.08); *A23P 10/20* (2016.08); *A23V 2002/00* (2013.01); *A23V 2200/21* (2013.01); *A23V 2250/5118* (2013.01); *A23V 2250/5486* (2013.01); *A23V 2300/31* (2013.01)

(58) Field of Classification Search
CPC ........ A23L 33/185; A23L 7/126; A23L 27/40; A23L 29/212; A23P 10/20; A23G 1/44; A23G 3/44; A23J 3/18; A23V 2002/00; A23V 2200/21; A23V 2250/5118; A23V 2250/5486; A23V 2300/31
See application file for complete search history.

(56) References Cited

U.S. PATENT DOCUMENTS 4,260,637 A * 4/1981 Rispoli ................... A23L 7/157
                                                          426/96
6,592,915 B1   7/2003 Froseth et al.
(Continued)

FOREIGN PATENT DOCUMENTS

| EP | 1940240 | | 1/2007 |
| WO | WO2016133125 | * | 8/2016 |

OTHER PUBLICATIONS

Translation for WO2016133125 published Aug. 2016.*

(Continued)

*Primary Examiner* — Anthony J Weier
(74) *Attorney, Agent, or Firm* — Husch Blackwell LLP

(57) ABSTRACT

Provided herein are compositions that are useful as binding agents for clusters, bars, and other food applications where various components need to be adhered to each other. The binding agents include a wheat protein isolate in combination with flour and water.

18 Claims, 15 Drawing Sheets

(56) References Cited

U.S. PATENT DOCUMENTS

| | | | |
|---|---|---|---|
| 7,297,354 | B2 | 11/2007 | Miller et al. |
| 8,551,544 | B2 | 10/2013 | Borders et al. |
| 9,603,381 | B2 | 3/2017 | Mesu |
| 2003/0113434 | A1 | 6/2003 | Marsland |
| 2006/0153965 | A1* | 7/2006 | Borders ................. A23L 11/03 426/634 |
| 2007/0014914 | A1* | 1/2007 | Borders ............... A23L 33/185 426/656 |
| 2007/0128340 | A1 | 6/2007 | Andrews et al. |
| 2008/0254200 | A1* | 10/2008 | Bassi ....................... A23J 1/12 426/656 |
| 2010/0310712 | A1* | 12/2010 | Ashourian ............. A23L 19/18 426/7 |
| 2012/0269939 | A1 | 10/2012 | Hahn et al. |
| 2014/0142285 | A1* | 5/2014 | Germain ............... A23L 33/185 530/375 |

OTHER PUBLICATIONS

Prepared Foods, Sweetener Strategies, Jun. 15, 2017, Accessed at: https://www.preparedfoods.com/articles/119962-sweetener-strategies, pp. 1-8.

21 CFR 117.3, United States Food and Drug Administration, Apr. 1, 2016, pp. 367-371.

International Search Report and Written Opinion for PCT/US18/60778 dated Mar. 8, 2019.

* cited by examiner

WHEAT BASED BINDING AGENT AND METHODS OF MAKING AND USING SAME

CROSS-REFERENCE TO RELATED APPLICATIONS

This Application claims priority to U.S. Provisional Patent Application Ser. No. 62/585,327, filed on Nov. 13, 2017, to Brook Carson and Neal Bassi, entitled "Wheat Based Binding Agent," the entire disclosure of which is incorporated herein by reference.

BACKGROUND

The market for ready-to-eat food bar products continues to grow, due to the convenience of such bars for busy consumers and the perception of healthiness that such products enjoy. Unfortunately, however, many ready-to-eat food bars on the market today are very high in sugar, often due to large quantities of added sugars. As consumers increasingly prefer lower-sugar snack and meal options, there is a need in the market to provide lower-sugar solutions.

Furthermore, new Food and Drug Administration labeling guidelines will soon require added sugars to be identified separately, in addition to the total sugar content. This regulatory requirement will give consumers a new perspective on the amount of sugar added to food products, and is likely to further increase their preference for lower-sugar options.

Currently, the ready-to-eat food bar market also provides a limited selection of non-sweet bars, and a particularly limited selection of savory bars. Many consumers who currently avoid the ready-to-eat food bar market, because a sweet product is not their preference, may become interested in purchasing non-sweet or savory bars if such products were readily available.

There is therefore a need in the market for ready-to-eat food bar products having lower sugar content. There is additionally a need in the market for ready-to-eat food bar products having a non-sweet or savory flavor profile.

SUMMARY OF THE INVENTION

In one aspect, provided herein is a ready-to-eat food product comprising a binding agent and a food substrate. The binding agent can comprise a wheat protein isolate, flour, and water, wherein the binding agent comprises at least about 10% by weight of the wheat protein isolate in one embodiment, and at least about 20% by weight of the wheat protein isolate in another embodiment. The food substrate can comprise a plurality of pieces, the pieces being adhered to one another by the binding agent.

In another aspect, provided herein is a method of preparing a ready-to-eat food product comprising a binding agent and a food substrate. The method can comprise mixing a wheat protein isolate with flour and water, thus forming a binding agent having at least about 20% by weight of the wheat protein isolate, and mixing the binding agent with a food substrate comprising a plurality of pieces, thereby adhering the pieces together and forming a food product.

Other objects and features will be in part apparent and in part pointed out hereinafter.

DESCRIPTION OF THE FIGURES

For a better understanding of the various embodiments, reference may be made to the accompanying figures in which.

DETAILED DESCRIPTION OF THE INVENTION

Figure 1:
FIG. 1 depicts Sample #1 of Example 2 after 10 minutes of mixing.
Figure 2:
FIG. 2 depicts Sample #2 of Example 2 after 8 minutes of mixing.
Figure 3:
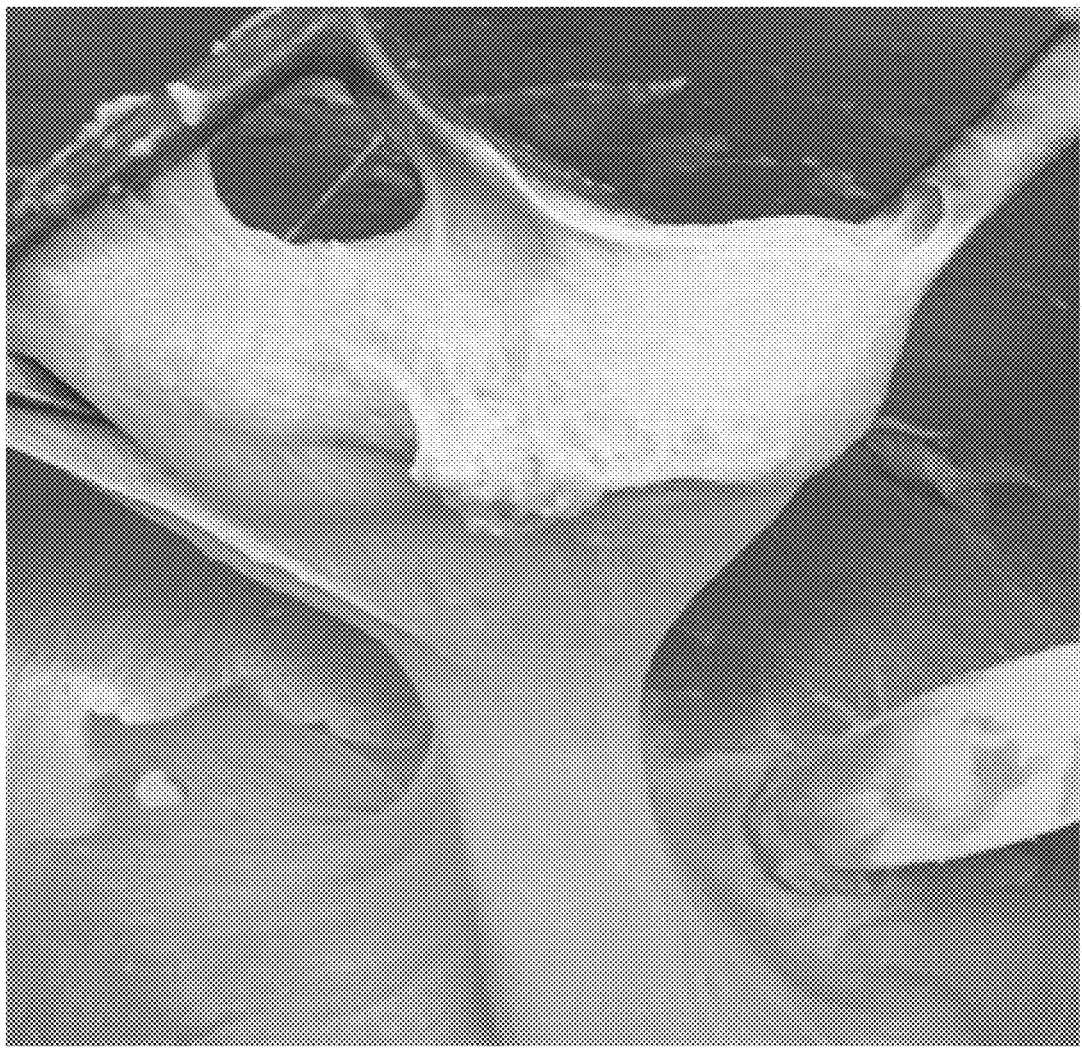
FIGS. 3 and 4 depict Sample #3 of Example 2 after 10 minutes of mixing.
Figure 4:
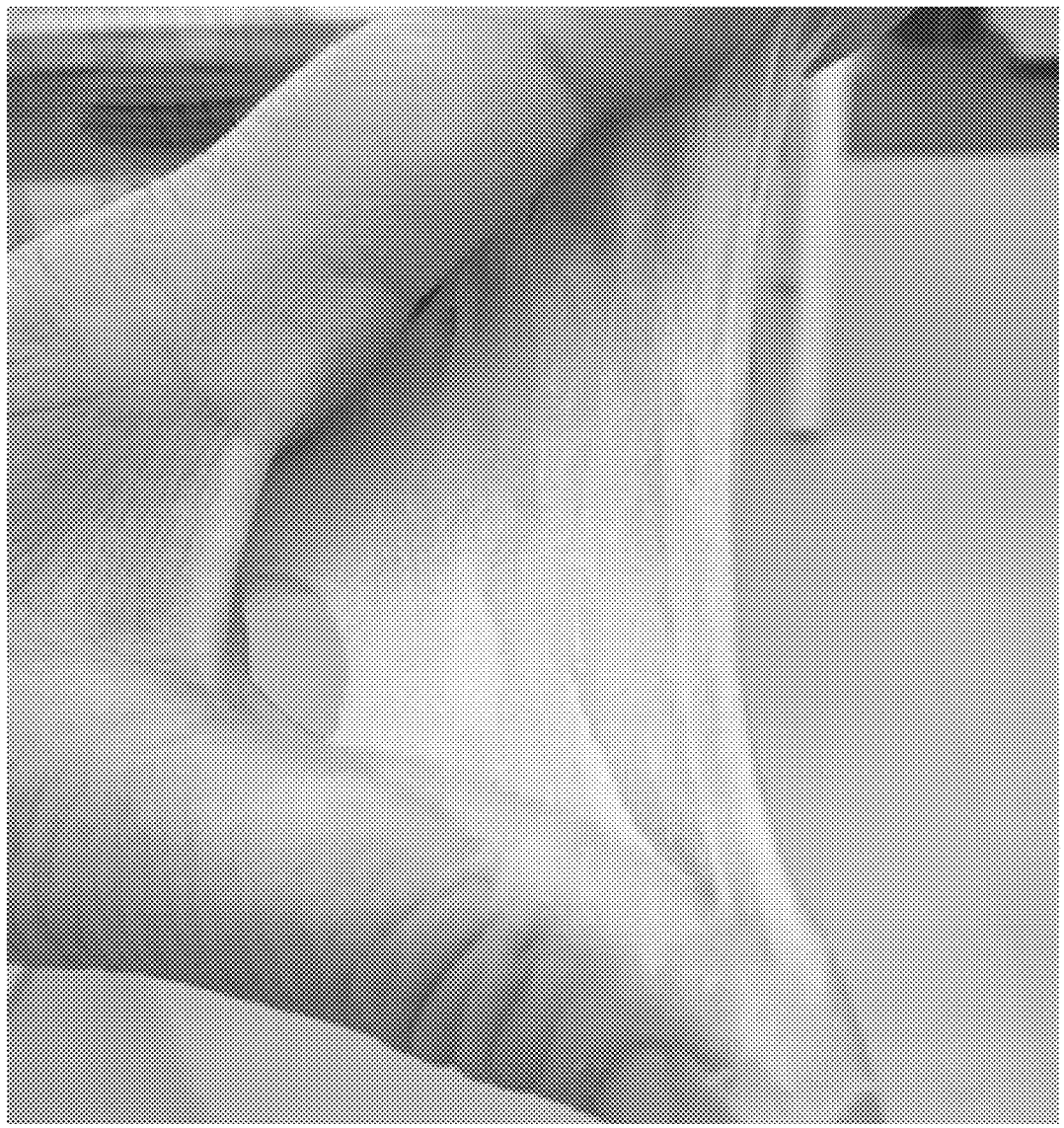
Figure 5:
FIGS. 5 and 6 depict Sample #4 of Example 2 after 10 minutes of mixing.
Figure 6:
Figure 7:
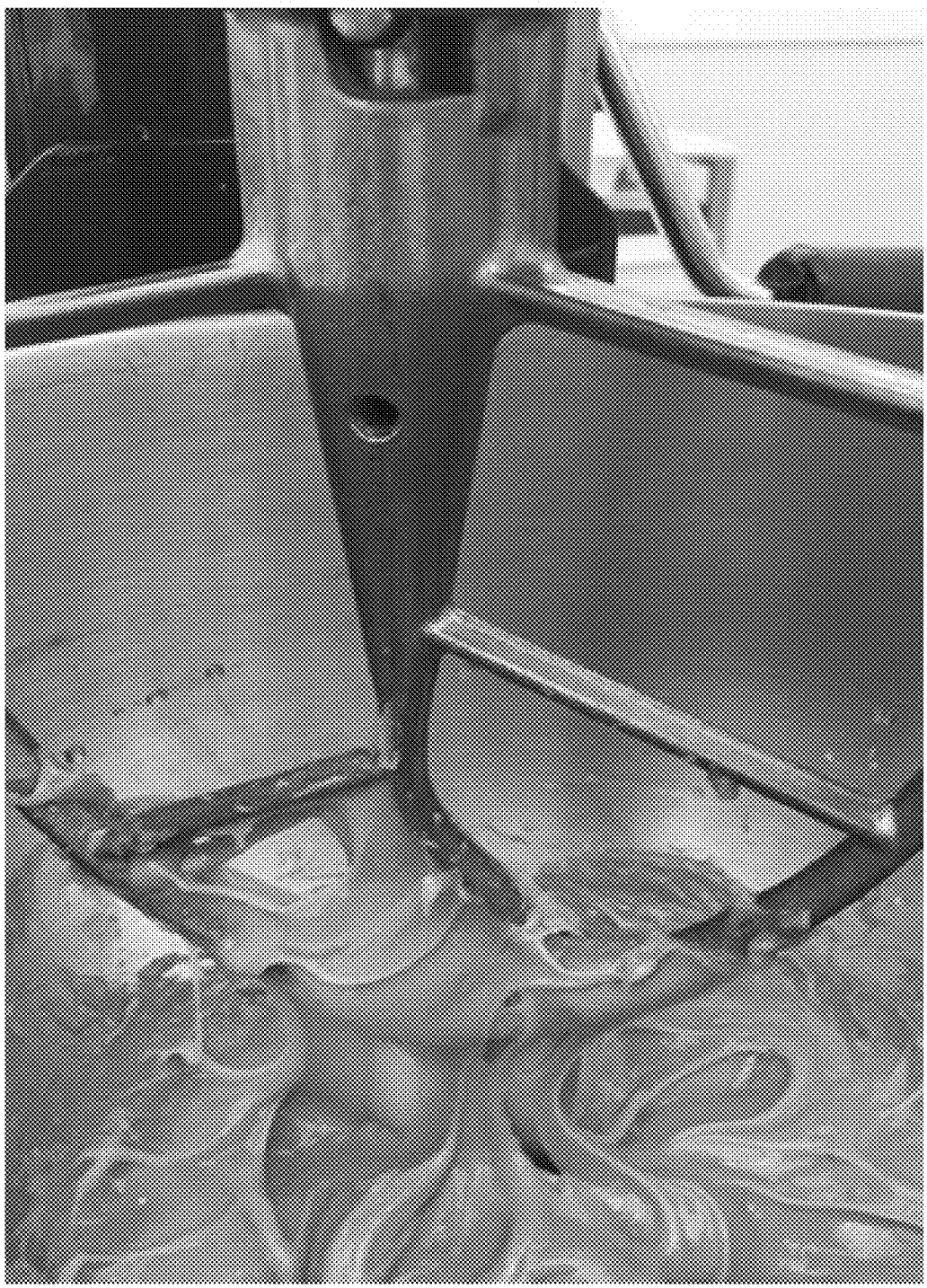
FIGS. 7 and 8 depict Sample #6 of Example 2 after 8 minutes of mixing.
Figure 8:
Figure 9:
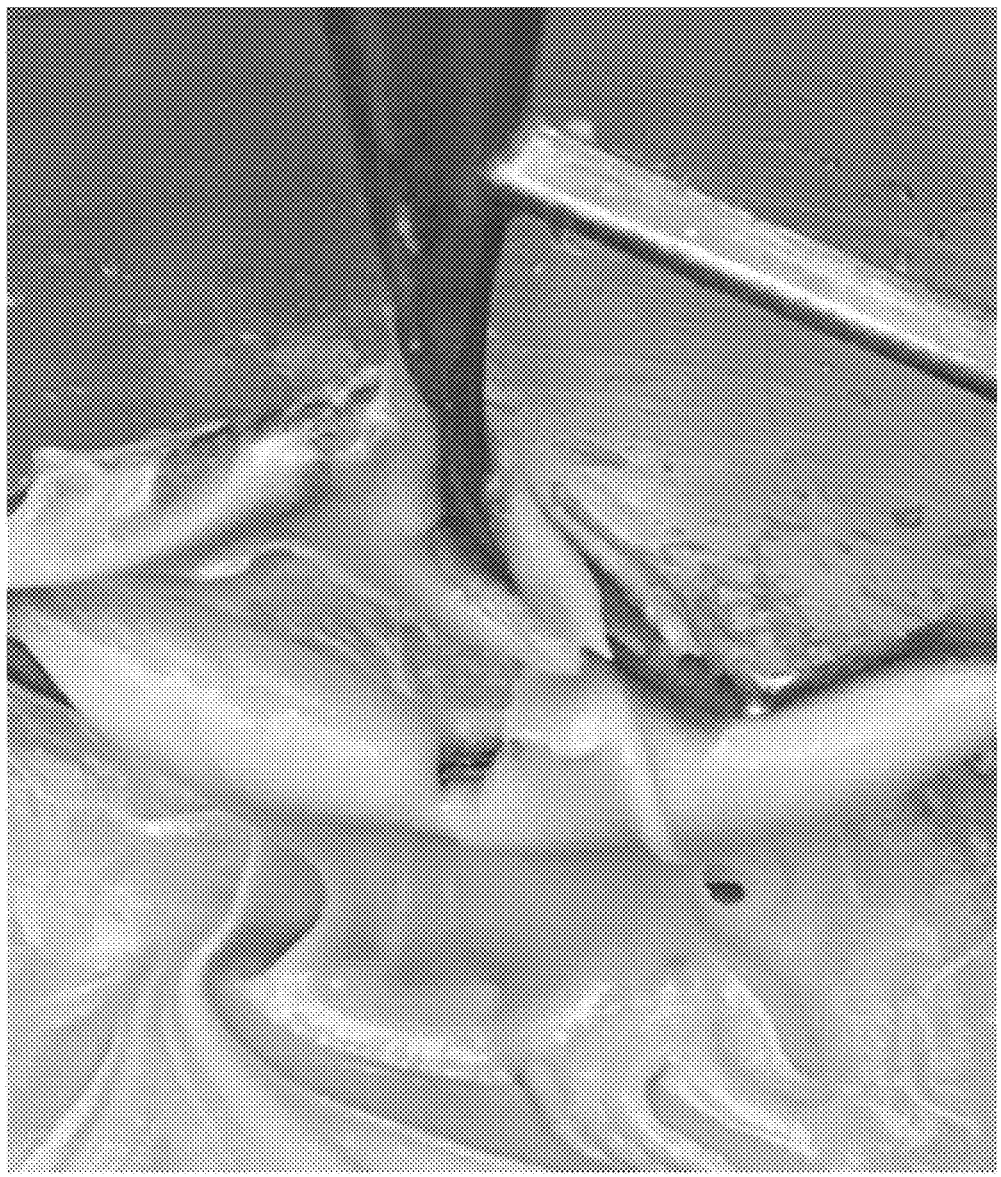
FIGS. 9 and 10 depict Sample #4A of Example 3 after 10 minutes of mixing.
Figure 10:
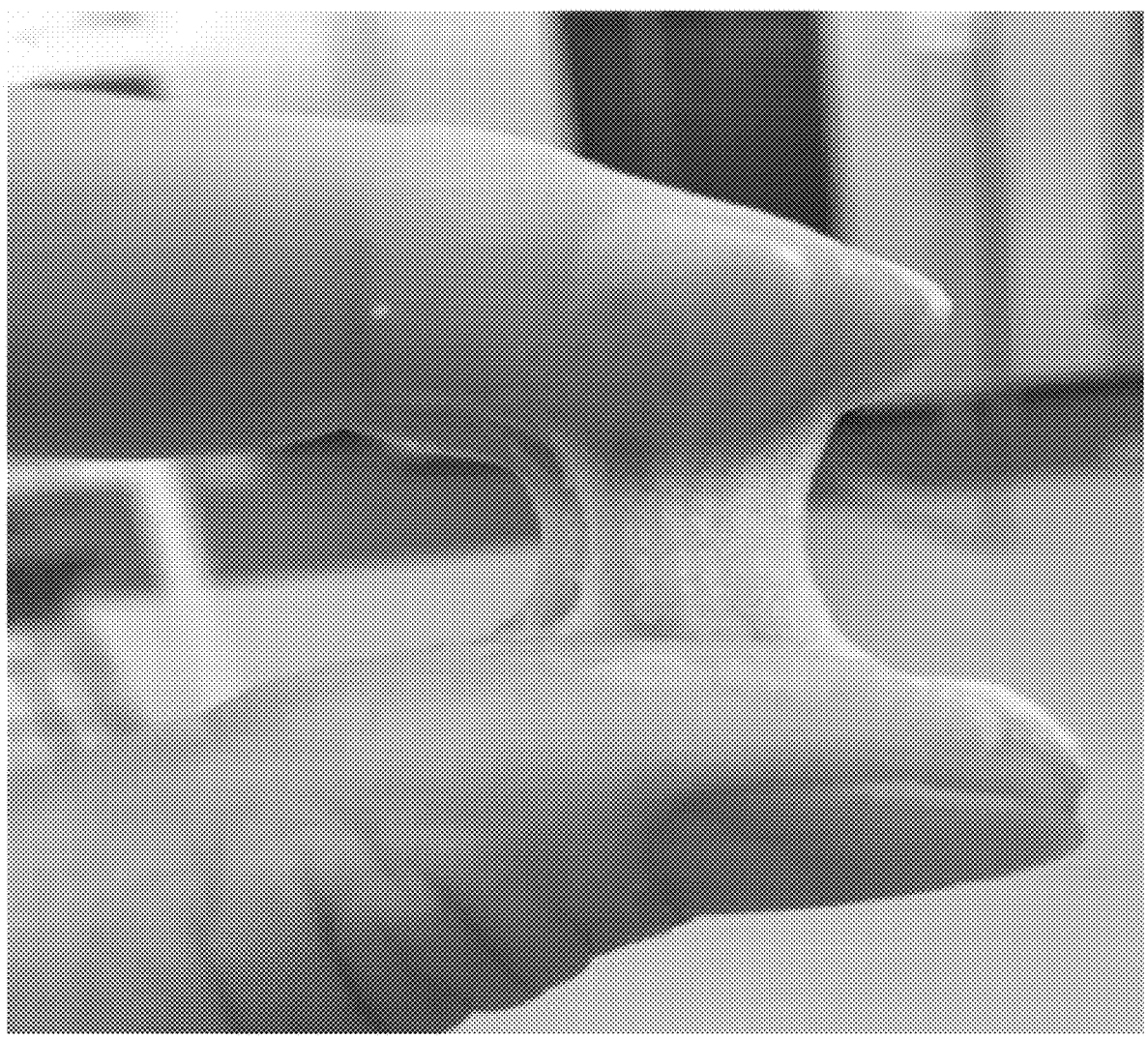
Figure 11:
FIG. 11 depicts Sample #7 of Example 2 after 8 minutes of mixing.
Figure 12:
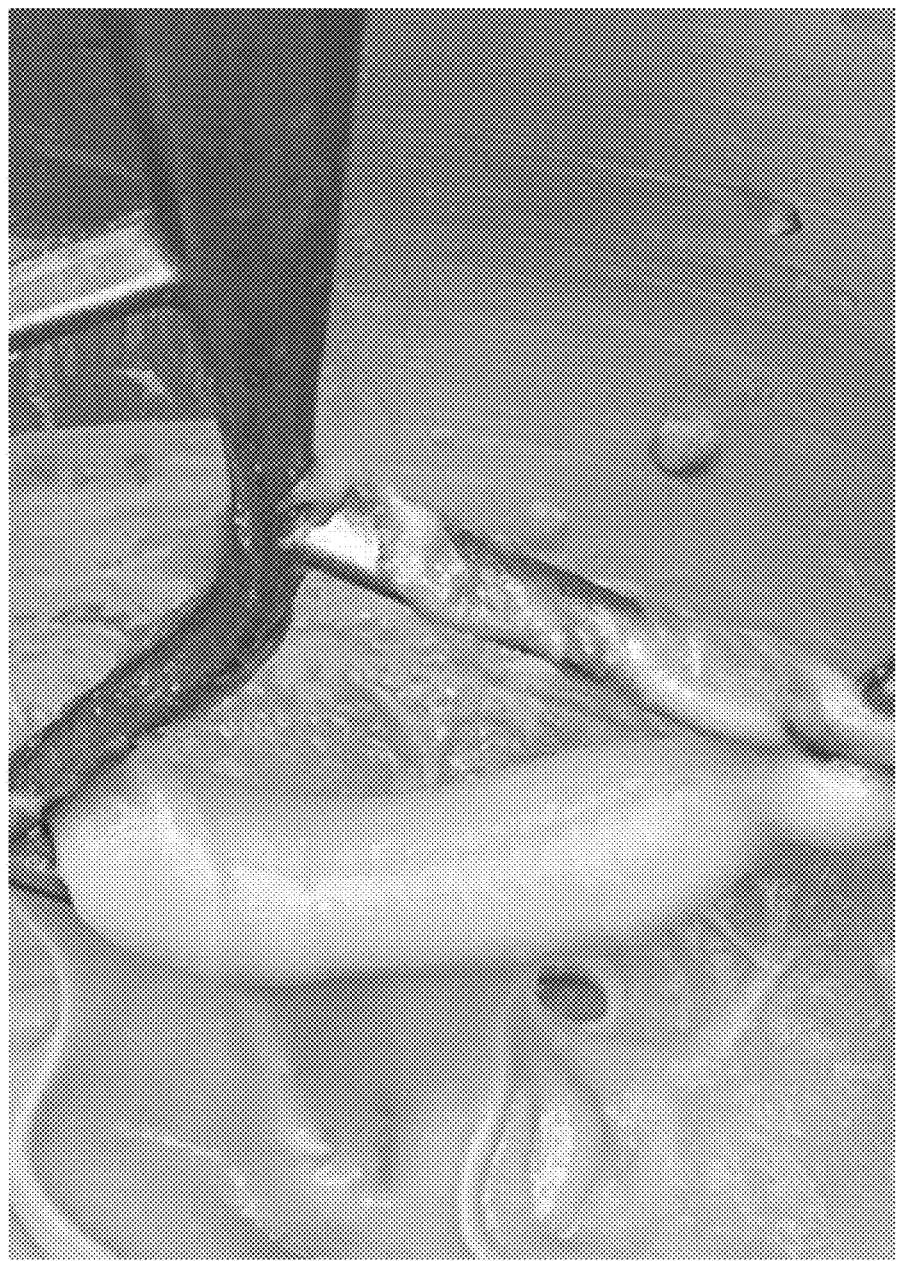
FIGS. 12 and 13 depict Sample #8 of Example 2 after 10 minutes of mixing.
Figure 13:
Figure 14:
FIGS. 14 and 15 each depict ready-to-eat food products comprising a binding agent and a substrate as described herein.
Figure 15:

The invention will now be described with reference to the figures. The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Provided herein are compositions that are useful as binding agents for clusters, bars, and other food applications where various components need to be adhered to each other. As described in further detail below, the binding agents comprise a wheat protein isolate in combination with flour. In preferred embodiments, the binding agent composition comprises at least about 20% by weight of the wheat protein isolate.

The binding agent composition does not provide the sweetness of traditional sugar-based binding agents, which is a significant benefit in applications where a savory bar or cluster is desired. Reducing added sugars and replacing them with protein is also nutritionally beneficial for many consumers. Alternatively, although the binding agent is capable of replacing sugar-based binders, it can also be used in combination with sugar in the event sweetness is desired for a particular application.

Without being bound to a particular theory, it is believed that the wheat protein isolate acts as a reducing agent to turn the flour or other wheat protein into a flowable, glue-like consistency. When the proteins are hydrated, they become activated and begin to reduce the cysteine bonds in the flour, thereby forming a flowable gluten network. This network can then act as a film, or binder, which exhibits good adhesiveness and can hold particulate food products together.

Binding Agent

The binding agent comprises a wheat protein isolate. The wheat protein isolate preferably comprises at least about 90% by weight of wheat protein. Non-limiting examples of commercially available wheat protein isolates include the GemPro® products available from Manildra Group USA, including but not limited to, GemPro® Tack.

The binding agent may comprise a single wheat protein isolate component, or may comprise a combination of two or more wheat protein isolate components. For example, in one embodiment, the binding agent consists essentially of a combination of two or more wheat protein isolate components. In preferred embodiments, the binding agent comprises at least about 5%, at least about 10%, at least about 15%, at least about 20%, at least about 30%, at least about 40%, or at least about 50% by weight of a wheat protein isolate. In alternative embodiments, the binding agent can comprise greater than 50%, for example, at least about 60%, at least about 70%, at least about 80%, or at least about 90% by weight of wheat protein isolate.

In some embodiments, the binding agent may comprise a flour. Non-limiting examples of flours that can be incorporated into the binding agent include wheat flour, corn flour, rice flour, potato flour, and nut flours (such as almond flour, peanut flour, and walnut flour). In some embodiments, the binding agent composition comprises two or more different types of flour. The binding agent preferably comprises wheat flour.

The binding agent preferably comprises the flour in a weight ratio of at least about 1:1 relative to the wheat protein isolate. For example, the binding agent can comprise flour in a weight ratio of from about 1:1 to about 10:1, from about 2:1 to about 8:1, from about 2:1 to about 6:1, or from about 3:1 to about 5:1 relative to the wheat protein isolate. In one embodiment, the binding agent comprises flour in a weight ratio of about 4:1 relative to the wheat protein isolate.

In alternative embodiments, the binding agent may comprise the wheat protein isolate in a weight ratio of greater than 1:1 with respect to the flour. For example, the binding agent can comprise the wheat protein isolate in a weight ratio of at least 1.5:1, at least about 2:1, at least about 2.5:1, or at least about 3:1 relative to the flour. In some embodiments, the binding agent comprises the wheat protein isolate in a weight ratio of from about 1:1 to about 10:1, from about 1:1 to about 5:1, from about 1:1 to about 4:1, or from about 1:1 to about 3:1 relative to the flour.

In embodiments where the binding agent comprises wheat protein isolate and flour, the binding agent preferably comprises, for example, the binding agent comprises from about 50% to about 95%, from about 60% to about 95%, from about 60% to about 90%, or from about 70% to about 90% by weight of flour. In these embodiments, the binding agent preferably comprises from about 5% to about 50%, from about 5% to about 40%, from about 10% to about 40%, from about 10% to about 30%, or from about 15% to about 30% by weight of wheat protein isolate.

In alternative embodiments, the binding agent can comprise from about 10% to about 70%, from about 15% to about 60%, or from about 20% to about 50% by weight of flour and from about 40% to about 100%, from about 50% to about 90%, or from about 50% to about 80% by weight of wheat protein isolate.

In some embodiments, the binding agent may comprise a starch. Non-limiting examples of starches that can be incorporated into the binding agent include wheat starch, corn starch, rice starch, and potato starch. In some embodiments, the binding agent consists essentially of wheat protein isolate and starch. In other embodiments, the binding agent may comprise starch in combination with wheat protein isolate and flour. In embodiments where starch is present, the binding agent may comprise, for example, from about 5% to about 25%, from about 5% to about 20%, or from about 5% to about 15% by weight of starch.

Food Substrate

As will be appreciated by those skilled in the art, a wide range of ingredients can be used either singularly or together as the food substrate. As used herein, the term "particulate food substrate" refers to any food comprising a plurality of particles, pieces, or clusters. The binding agents described herein can be used to adhere such pieces together into a cohesive, ready-to-eat food product.

Non-limiting examples of particulate food substrates include grains (e.g., cereals), granola, nuts, marshmallows, candies, fruits, chocolates, crackers, potato chips, jerky, seeds, cheeses, other savory products, and pieces and portions thereof. For example, the particulate food substrate can comprise one or more cereals (e.g., wheat, oats, and/or barley) which may be whole, flaked, rolled, puffed, or in any other form known to those skilled in the art.

Additional Ingredients

Those skilled in the art will appreciate that the binding agent composition may comprise one or more additional ingredients, as desired for a particular application.

For example, where additional sweetness is desirable, the binding agent composition may further comprise a source of added sugar. The sugar may be provided in any form, for example, as granulated sugar or as a syrup. Alternatively, in some embodiments, the binding agent is substantially free of added sugars.

It will also be appreciated that additional protein sources may included within the binding agent composition and/or within the food substrate. Such proteins may include, for example, soy, pea, dairy and other suitable proteins.

In some embodiments, the binding agent composition further comprises an oil. Oil is useful, for example, to improve the plasticity of the binder.

In some embodiments, the binding agent composition further comprises salt. In addition to enhancing the flavor of the food product, the addition of salt may in some cases enhance the network of the wheat protein isolate, and thus improve the adhesiveness of the binding agent.

The binding agent composition may comprise one or more conventional food additives known to those skilled in the art (e.g., glycerin). The binding agent composition may further comprise natural or artificial flavors, as appropriate to provide the desired taste profile.

Methods of Preparation

Also provided herein are methods of preparing food products comprising a binding agent and a food substrate as described herein.

The binding agent can be prepared, for example, by mixing a wheat protein isolate with flour and water. The binder may then be mixed with a particulate food substrate comprising a plurality of pieces, thereby adhering the pieces together and forming a food product.

In preferred embodiments, the food product is a ready-to-eat food product. In some embodiments, the ready-to-eat food product is baked to set its form and structure. In other embodiments, the ready-to-eat food product is not baked, resulting in a more deformable (chewy) product.

Other objects and features will be in part apparent and in part pointed out hereinafter.

EXAMPLES

The following non-limiting examples are provided to further illustrate the present invention.

Example 1: Particulate Food Bar Composition Example

A number of food bars were prepared using the ingredient mixtures set forth in Table 1 below. The table provides the amount of each ingredient, in grams, added to the mixture.

TABLE 1

| Sample # | 1 | 2 | 3 | 4 | 5 | 6 | 7 | 8 |
|---|---|---|---|---|---|---|---|---|
| Flour | 50 | 50 | 50 | 50 | 50 | 50 | 50 | 50 |
| Wheat Protein Isolate F | 10 | 10 | 8 | 12 | 15 | 12 | 12 | 12 |
| Water | 35 | 35 | 35 | 35 | 35.5 | 36.3 | 37 | 37 |
| Salt | 1 | 1 | 1 | 1 | 1 | 1 | 1 | 1 |
| Oil | 5 | 5 | 5 | 5 | 5 | 5 | 5 | 5 |
| Sugar | 0 | 0 | 0 | 0 | 0 | 10 | 20 | 30 |
| Stevia | 2 | 2 | 2 | 2 | 2 | 0 | 0 | 0 |
| Flavor | 1 | 1 | 1 | 1 | 1 | 1 | 1 | 1 |
| Protein Mask | 0 | 1 | 1 | 1 | 1 | 1 | 1 | 1 |
| Crisps | 50 | 40 | 40 | 40 | 40 | 40 | 40 | 40 |
| Almond | 10 | 10 | 10 | 10 | 10 | 10 | 10 | 10 |
| Oats | 20 | 30 | 30 | 30 | 30 | 30 | 30 | 30 |
| Chips | 10 | 10 | 10 | 10 | 10 | 10 | 10 | 10 |
| Seeds | 10 | 10 | 10 | 10 | 10 | 10 | 10 | 10 |

To prepare each sample, the ingredients for the binder composition (flour, WPI, water, salt, oil, sugar, stevia, flavoring, and protein mask) were mixed first, forming a paste. Then the remaining ingredients were added, and continued to mix until fully incorporated.

Double batches of Formulas 3-8 were prepared, so that one sample could be baked while an identical sample was left at room temperature. The baked samples were cooked at 275° F. for 10 minutes.

Example 2: High Protein Binding Agent Testing

A variety of sample binding agent compositions were prepared using a high percentage of wheat protein isolate.

In Table 2 below, the quantity of each ingredient in the binding agent is given as a weight percentage, relative to the binding agent as a whole (but exclusive of any added water). In each sample, the flour was a commercially available all-purpose wheat flour.

TABLE 2

| Sample # | Flour | Starch | Wheat Protein Isolate A | Wheat Protein Isolate F | Wheat Protein Isolate G |
|---|---|---|---|---|---|
| 1 | 50 | 0 | 0 | 50 | 0 |
| 2 | 40 | 0 | 0 | 50 | 10 |
| 3 | 20 | 0 | 40 | 40 | 0 |
| 4 | 20 | 0 | 20 | 60 | 0 |
| 5 | 0 | 0 | 50 | 50 | 0 |
| 6 | 20 | 10 | 0 | 70 | 0 |
| 7 | 0 | 15 | 5 | 80 | 0 |
| 8 | 0 | 5 | 30 | 65 | 0 |

Example 3: Food Binder Composition

A food binder composition was prepared using a high protein binding agent as described herein. The food binder composition was comprised of the high protein binding agent, soybean oil, water, and salt in the amounts indicated in Table 3 below.

TABLE 3

| Ingredient | Weight Percentage |
|---|---|
| High Protein Binding Agent | 57.0 |
| Soybean Oil | 7.5 |
| Water | 34.5 |
| Salt | 1.0 |

Example 4: Fruit and Nut Clusters

Fruit and Nut Clusters were prepared using a high protein binding agent as described herein. Two varieties of clusters were prepared using the ingredient mixtures set forth in Tables 4A and 4B below. The table provides the amount of each ingredient, in grams, added to the mixture.

TABLE 4A

| | Particulate Mixture | |
|---|---|---|
| Ingredient | Variety #1 | Variety #2 |
| Mixed Nut Blend | 170.0 | — |
| Pistachio Mix | — | 170.0 |
| Dried Cranberries | 60.0 | 60.0 |

TABLE 4B

| | Binder Composition | |
|---|---|---|
| Ingredient | Variety #1 | Variety #2 |
| High Protein Binding Agent | 28.5 | 28.5 |
| Oil | 3.7 | 3.7 |
| Water | 22.3 | 22.3 |
| Salt | 0.5 | 0.5 |

To prepare each variety, the ingredients for the binder composition (the high protein binding agent, oil, water, and salt) were combined in a mixing bowl using a paddle attachment, and mixed on medium speed for 2 minutes. The bowl was then hand-scraped and the ingredients were mixed for an additional 5 minutes.

The particulate ingredients (nuts and dried fruit) were then added, and the combined mixture was mixed for 30 seconds. After being allowed to rest for 3 minutes, the combined mixture was pressed into the desired (cluster) shapes and baked at 350° F. for 12 minutes, thereby providing ready-to-eat fruit and nut clusters.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying figures are to be interpreted as illustrative and not limiting.

The constructions described above and illustrated in the figures are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. When introducing elements of the present disclosure or the preferred embodiment(s) thereof, the articles "a", "an", "the", and "said" are intended to mean that there are one or more of the elements. The terms "comprising," "including," and "having" are intended to be inclusive, mean that there may be additional elements other than the listed elements, and are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of preparing a ready-to-eat food product comprising an adhesive binding agent and a food substrate, the method comprising:
    mixing a wheat protein isolate with flour and water, thus forming an adhesive binding agent having at least about 10% by weight of the wheat protein isolate; and
    subsequently mixing the adhesive binding agent with a particulate food substrate comprising a plurality of pieces, thereby adhering the pieces together and forming a food product.

2. The method of claim 1, wherein the wheat protein isolate comprises at least about 90% by weight of wheat protein.

3. The method of claim 1, wherein the adhesive binding agent comprises flour in a weight ratio of at least about 1:1 relative to the wheat protein isolate.

4. The method of claim 1, wherein the adhesive binding agent comprises from about 50% to about 95% by weight of flour.

5. The method of claim 1, wherein the adhesive binding agent comprises from about 5% to about 50% by weight of wheat protein isolate.

6. The method of claim 1, wherein the particulate food substrate comprises one or more foods selected from the group consisting of grains, granola, nuts, marshmallows, candies, fruits, chocolates, crackers, potato chips, jerky, seeds, cheeses, and pieces and portions thereof.

7. The method of claim 1, wherein the adhesive binding agent further comprises an oil.

8. The method of claim 1, wherein the adhesive binding agent further comprises salt.

9. The method of claim 1, wherein the adhesive binding agent further comprises from about 5% to about 25% by weight of a starch.

10. A ready-to-eat food product prepared according to the method of claim 1.

11. A ready-to-eat food product comprising:
    a binding agent including a wheat protein isolate, flour, and water, wherein the binding agent comprises at least about 20% by weight of the wheat protein isolate; and
    a food substrate including a plurality of pieces, the pieces being adhered to one another by the binding agent.

12. The ready-to-eat food product of claim 11, wherein the binding agent comprises flour in a weight ratio of at least about 1:1 relative to the wheat protein isolate.

13. The ready-to-eat food product of claim 11, wherein the binding agent comprises from about 50% to about 95% by weight of flour.

14. The ready-to-eat food product of claim 11, wherein the binding agent comprises from about 20% to about 50% by weight of wheat protein isolate.

15. The ready-to-eat food product of claim 11, wherein the food substrate comprises one or more foods selected from the group consisting of grains, granola, nuts, marshmallows, candies, fruits, chocolates, crackers, potato chips, jerky, seeds, cheeses, and pieces and portions thereof.

16. The ready-to-eat food product of claim 11, wherein the binding agent further comprises an oil.

17. The ready-to-eat food product of claim 11, wherein the binding agent further comprises salt.

18. The ready-to-eat food product of claim 11, wherein the binding agent further comprises from about 5% to about 25% by weight of a starch.

* * * * *